US006650523B1

United States Patent
Kleemeier et al.

(10) Patent No.: US 6,650,523 B1
(45) Date of Patent: Nov. 18, 2003

(54) PROTECTIVE DEVICE, IN PARTICULAR A FAULT CURRENT PROTECTIVE DEVICE

(75) Inventors: Manfred Kleemeier, Neutraubling (DE); Gerald Lehner, Obertraubling (DE); Reinhard Schmid, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 52 days.

(21) Appl. No.: 10/069,287
(22) PCT Filed: Aug. 9, 2000
(86) PCT No.: PCT/DE00/02656
§ 371 (c)(1), (2), (4) Date: Feb. 25, 2002
(87) PCT Pub. No.: WO01/15297
PCT Pub. Date: Mar. 1, 2001

(30) Foreign Application Priority Data

Aug. 25, 1999 (DE) .......................... 199 40 344

(51) Int. Cl.$^7$ ................................................ H02H 9/02
(52) U.S. Cl. ........................................ 361/93.6; 361/47
(58) Field of Search ............................. 361/93.1, 93.6, 361/93.5, 42, 47

(56) References Cited

U.S. PATENT DOCUMENTS 4,091,431 A * 5/1978 Morris ......................... 361/45
4,860,146 A * 8/1989 Pohl et al. .................... 361/42

FOREIGN PATENT DOCUMENTS

| DE | 38 23 098 A1 | 1/1990 |
| DE | 197 02 371 A1 | 7/1998 |
| EP | 0 454 516 A2 | 1/1992 |
| EP | 0 855 779 A2 | 7/1998 |

* cited by examiner

*Primary Examiner*—Shawn Riley
(74) *Attorney, Agent, or Firm*—Harness, Dickey & Pierce, P.L.C.

(57) ABSTRACT

Two detection systems are provided for a protective device, in particular an FI protective device, having a core balance transformer whose secondary winding is followed by a tripping relay for operating a switching mechanism, which switches a conductor network. In this case, a first detection system carries out the tripping function for fault currents at a fault current frequency below a changeover frequency. The second detection system carries out the tripping function for fault currents above the changeover frequency. The changeover frequency is in this case preferably not less than 1 kHz.

21 Claims, 5 Drawing Sheets

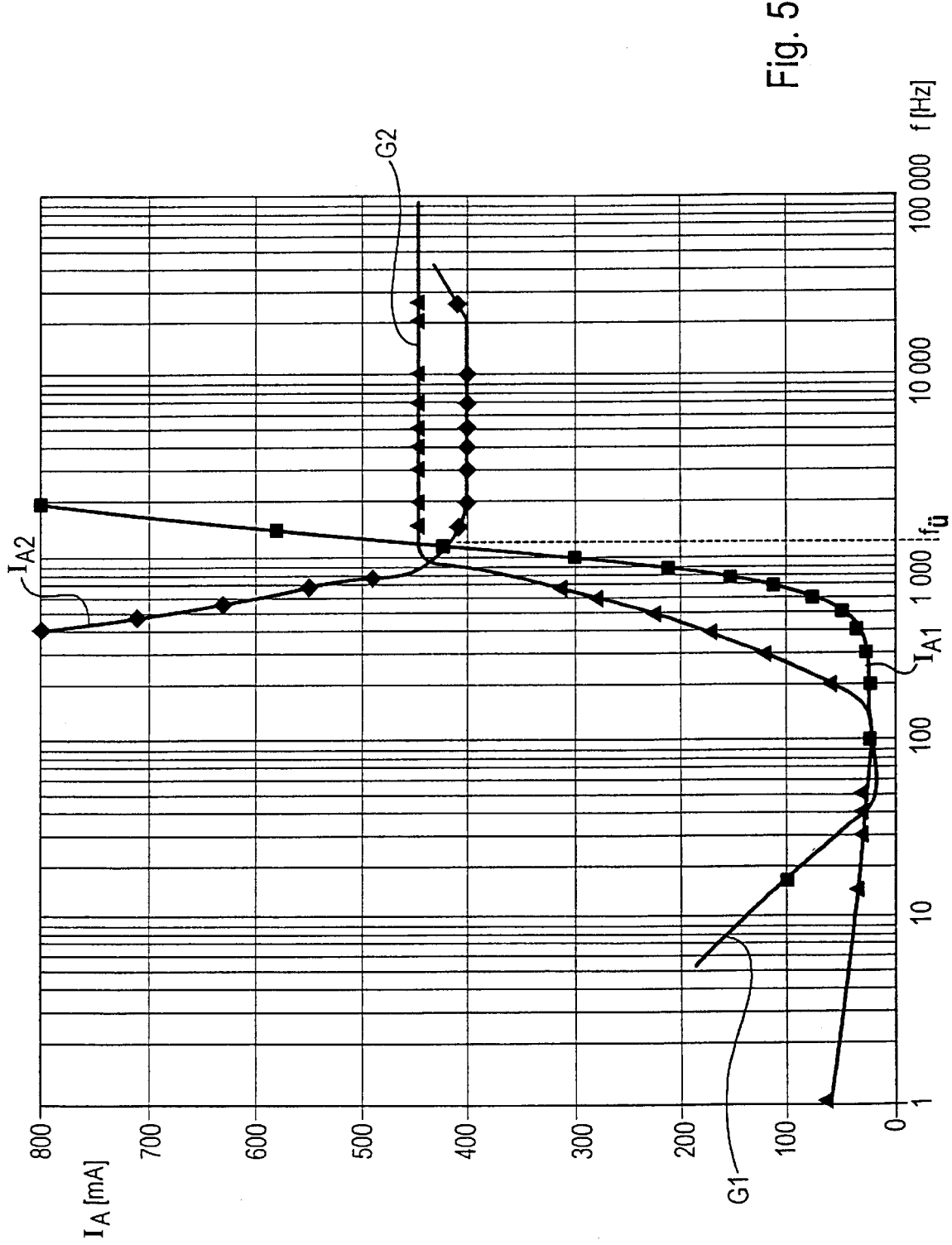

PROTECTIVE DEVICE, IN PARTICULAR A FAULT CURRENT PROTECTIVE DEVICE

This application is the national phase under 35 U.S.C. §371 of PCT International Application No. PCT/DE00/02656 which has an International filing date of Aug. 8, 2000, which designated the United States of America, the entire contents of which are hereby incorporated by reference.

FIELD OF THE INVENTION

The invention generally relates to a protective device. Preferably, it includes at least one detection system with a core balance transformer whose secondary winding is followed in a tripping circuit by a tripping relay for operating a switching mechanism which switches a conductor network. A tripping circuit is a circuit along which an electrical monitoring variable is produced and is assessed. Further, such a circuit produces an electrical tripping signal which activates a tripping relay (causes it to trip), for example, when a tripping condition is satisfied. A protective device can include a fault current protective device and/or a differential current protective device, for example.

BACKGROUND OF THE INVENTION

Such a fault current protective device is used to ensure protection against a dangerous body current in an electrical system. Such a body current occurs, for example, when someone touches a live part of an electrical system. The fault current (or else differential current) then flows via the person as a body current to ground. The protective device that is used for protection against the dangerous body currents disconnects the relevant circuit from the main system quickly and safely when the so-called tripping fault current is exceeded.

The construction of known fault current protective devices is known, for example, from "etc" (1986), Issue 20, pages 938 to 945. FIGS. 1 to 3 there show outline circuit diagrams and functional principles of a fault current circuit breaker (FI circuit breaker) and of a differential current circuit breaker (DI circuit breaker). FI and DI circuit breakers are constructed, in a similar way from three assemblies. When a fault current occurs, a voltage signal is induced in the secondary winding of a core balance transformer, through whose transformer core all the current-carrying conductors of a conductor network are passed. This voltage signal actuates a tripping relay, which is connected to the secondary winding via tripping circuit electronics, or via a tripping circuit. The tripping relay then operates a switching mechanism, via which the conductors of the conductor network are disconnected. In this case, the tripping circuit of the FI circuit breaker is coupled purely inductively via the core balance transformer to the conductor network. It thus takes the energy required for tripping from the fault current itself, irrespective of the main system voltage. In contrast, in a DI circuit breaker, tripping takes place as a function of the main system voltage via an amplifier circuit, which is conductively connected to the conductor network.

The tripping fault current is defined in DIN VDE Standard 0664 Part 10 (=German translation of EN Standard 61008). This is the value of the fault current which causes an FI or DI circuit breaker to trip in defined conditions. In this case, the tripping fault current for, for example, sinusoidal alternating fault currents is 0.5 to 1.0 times the rated fault current, which is in turn a measure of the tripping sensitivity of the FI or DI circuit breaker. Thus, for example, in order to protect personnel coming into direct contact with active parts, the rated fault current must not exceed 30 mA, while an FI protective device with a rated fault current of more than 30 mA offers protection only against indirect contact.

The tripping response of the circuit breaker is furthermore normally also matched to a specific frequency, for example to 50 Hz, or to a specific frequency band, for example from 50 Hz to 400 Hz. Nevertheless, despite this matching, these protective devices can also offer personnel protection at higher frequencies, provided the tripping fault current is below the specified limit curve for ventricular fibrillation, in accordance with IEC Standard 60479. In accordance with this limit curve, the tripping current may rise to approximately 420 mA at 1 kHz, in order still to offer personnel protection.

In order to ensure, furthermore, that such a protective device provides fire protection as well, a maximum electrical power of 100 W must not be exceeded, irrespective of the frequency, in order to avoid fires. If the voltage between an outer conductor and ground is assumed to be 230 V, this results in a maximum tripping fault current of 430 mA, which must not be exceeded, in order to avoid fires. Other limit values for the tripping fault current for other main system voltages correspond to this.

However, DI and FI protective devices until now have had the problem that their tripping fault current rises continuously as the frequency increases and, at high frequencies, in particular in the kilohertz band, exceeds the maximum acceptable value for fire protection of, in this example, 430 mA. For applications in electrical systems in which frequency changers and appliances with pulsed power supplies are used, fault currents having fault current frequencies up to about 20 kHz, furthermore, can also occur in the event of a fault. Thus, the tripping fault current of the protective device or of the circuit breaker rises beyond the limit value, in the described manner, and fire protection is no longer ensured in all cases. As a result of the greatly increasing number of equipment items which can generate such fault currents at a relatively high frequency in the event of a fault, this problem is becoming increasingly important.

SUMMARY OF THE INVENTION

An embodiment of the invention is based on an object of specifying a protective device, in particular a fault current protective device, via which it is also possible to detect fault currents at a fault current frequency of more than 1 kHz. The tripping fault current should not exceed the respective predetermined limit values for personnel protection and fire protection, in particular over a frequency band from about 50 Hz to at least 20 kHz.

According to an embodiment of the invention, this object can be achieved by a protective device.

An embodiment may be based on the idea that, in the case of a protective device such as this and even over a wide frequency range from, for example, 50 Hz to at least 20 kHz, firstly, fire protection is ensured provided the tripping fault current is less than 430 mA for 100 W and 230 V and, secondly, at the same time, personnel protection is provided as long as the tripping fault current is always below the limit curve for ventricular fibrillation in accordance with IEC 60479. Since, as is known, the limit curve for ventricular fibrillation reaches a value of 420 mA at a fault current frequency of about 1 kHz, and is thus virtually equivalent to the limit value for fire protection, the tripping fault current would need to be restricted to this limit value only above a corresponding changeover frequency, while the tripping fault current for fault current frequencies below this changeover frequency should have a profile below the limit curve for ventricular fibrillation and, in this case, should follow this profile as closely as possible.

This can be achieved in a reliable manner via two detection systems of different design, one of which provides the tripping function below this changeover frequency, while the other provides the tripping function above this changeover frequency which is, for example, between 1 kHz and 5 kHz, and preferably in the band between 1 kHz and 2 kHz.

A first detection system, which provides the tripping function below the changeover frequency, can be expediently matched to a fault current frequency of 50 Hz, or for fault currents in the comparatively broad frequency band from, for example, 50 kHz to 400 kHz. At this frequency, or in this frequency band, the tripping conditions can be satisfied, in accordance with EN Standard 61008 (which corresponds to VDE 0664 Part 10) for a protective device which is sensitive to pulsed currents (corresponding to Type A in accordance with EN 61008). The first detection system may have added to it a detection system for smooth direct fault currents whose fault current frequency is 0 Hz, so that, overall, this results in a protective device which is sensitive to all currents.

The second detection system can be matched to a frequency band which is wider than that of the first detection system, such that, at least above the changeover frequency, the tripping signal of the second detection system is greater than the tripping signal of the first detection system. This advantageously means that the second detection system provides the tripping function above this changeover frequency. The tripping value, that is to say the tripping fault current of either the first detection system or of the second detection system, is thus always below the respectively lower limit value for ventricular fibrillation or fire protection. This ensures that the tripping fault current of the overall protective device is always below this limit value.

These two detection systems, which are matched to different frequency bands enable the tripping fault current of the protective device in the band above the changeover frequency to not only be below the limit curve for ventricular fibrillation, but to also be below the limit curve for reliable fire protection. Below the changeover frequency, the tripping fault current is, furthermore, also always below the limit curve for ventricular fibrillation, which rises continuously from about 50 Hz as the fault current frequency increases.

The two detection systems may each be formed from a core balance transformer and a tripping relay which is fed via the secondary winding of this core balance transformer. The two detection systems may also feed one tripping relay, which is common to the two of them. However, a single core balance transformer is expediently provided for both detection systems, in which case the core balance transformer, which is preferably designed to detect both low-frequency and high-frequency fault currents, then has two secondary windings, which once again preferably feed a common tripping relay.

To this end, the transformer core of the single core balance transformer is designed in accordance with Type AC from German Standard VDE 0664, Part 10, which corresponds to EN Standard 61008, for detecting sinusoidal alternating fault currents, or in accordance with Type A from EN Standard 61008 for detecting sinusoidal alternating fault currents and pulsating direct fault currents. In addition, the transformer core is designed to detect both low-frequency fault currents, in particular below 1 kHz, and high-frequency fault currents, in particular from 1 kHz up to at least 20 kHz. High-frequency fault current forms at, for example, several kilohertz are, in particular, detected by a core balance transformer whose transformer core is formed from nanocrystalline or amorphous material. The use of nanocrystalline core material for this purpose is known per se, for example from DE 197 02 371 A1. Such a material is a rapidly solidifying soft-magnetic alloy, whose electrical resistance is advantageously two to three times greater than that of crystalline soft-magnetic materials. In conjunction with small strip thicknesses, resulting from the production technique, of typically 20 μm, eddy current losses are considerably reduced, so that this amorphous or nanocrystalline material is particularly advantageous for the high-frequency band.

In order to decouple the two detection systems from one another, each of the two detection systems has its own rectifier. Each of the rectifiers is connected on the alternating current side to that secondary winding, which is associated with the respective detection system, of the core balance transformer, which is preferably shared by the two detection systems. Since both rectifiers are preferably connected on the direct current side to a single tripping relay, a decoupling diode is connected in at least one of the two direct current circuits formed in this way. This enables the tripping relay to not represent a load on the respective other detection system which in each case draws power from the respective detection system that is operating with the tripping function.

If a single core balance transformer with two secondary windings is used for both detection systems, high-frequency disturbance fault currents can lead to circulating currents flowing via the two detection systems and via the tripping relay. Since a short time delay, which is intended to cope with such disturbance influences or overvoltages which are normally transient, may not be sufficient to cope with such circulating currents simultaneously, at least in the second detection system for high-frequency fault currents, it is expedient to connect at least one inductor on the direct current side in the second detection system for high-frequency fault currents. This allows such circulating currents to be damped such that short-term high-frequency disturbance fault currents, for example resulting from switching operations in the main system, do not lead to spurious tripping.

The first detection system expediently has a low-pass filter, preferably in the form of a parallel capacitor. This is of such a size, and is designed such that the tripping fault current rises, at least up to the changeover frequency, as the fault current frequency increases, while at the same time being below the limit curve for ventricular fibrillation. In this case, when using a parallel capacitor whose capacitance is preferably of such a magnitude that sinusoidal alternating fault currents at an increasing frequency lead to tripping fault currents which rise steeply in precisely such a way that the profile of the tripping force current, which is dependent on the fault current frequency, is still below the limit curve for ventricular fibrillation, but is as close to it as possible, while maintaining a sufficient safety margin. Such a relatively steep rise in the tripping fault current profile means that the first detection system, and hence the protective device, is insensitive to transient fault currents, so that the protective device has particularly good resistance to spurious tripping.

As the component which governs its function, the first detection system for low-frequency fault currents has a series resistor, which follows that secondary winding of the core balance transformer which is associated with this first detection system and is connected upstream of the parallel capacitance, which acts as a low-pass filter. The secondary winding of the first detection system is thus not directly short-circuited via the parallel capacitance, even at high frequencies. This ensures that the second detection system always receives an input signal which can be evaluated, even in the event of high-frequency fault currents, and in particular above the changeover frequency. The series resistor in the first detection system thus acts as a defined burden for the core balance transformer at high fault current frequencies and, to a major extent, is an additional governing factor for the tripping fault current for the second detection system above the changeover frequency.

The rectifier is preferably followed, at least in the first detection system, by a smoothing capacitor which, on the direct current side, is connected in parallel with the tripping relay. A zener diode, which is connected in parallel with the tripping relay on the direct current side in the first detection system, limits the voltage across the tripping relay, and prevents it from being remagnetized by high fault currents, in order to prevent a failure to trip. The zener diode, which preferably has a zener voltage of 1 V, is operated by virtue of the technology in the forward direction, and additionally improves the resistance of the protective device to surge currents.

In order to avoid spurious tripping in response to brief high-frequency fault currents such as those which can occur when switching inductive loads on long cables - , the second detection system preferably has a short time delay. To this end, the second detection system has a time delay element, that is to say a delay circuit, formed by a parallel capacitor and a series resistor. For a fault current of 430 mA and a fault current frequency of not less than 3 kHz, the tripping time is set to about 300 ms. The tripping time is thus considerably shorter than the required disconnection time in the TN network, which means that this provides particularly reliable fire protection.

The tripping relay expediently has at least one zener diode connected in parallel with it, both in the first detection system and in the second detection system. While the zener diode in the first detections system limits the voltage across the tripping relay and prevents remagnetization (which would lead to a failure to trip) of the tripping relay in the event of high fault currents, preferably two series-connected zanar diodes in the second detection system additionally limit the disturbance voltages which are induced in that secondary winding of the core balance transformer which is associated with this second detection system. The limited disturbance voltages are masked out in conjunction with the time delay element (delay circuit). A resistor, which is expediently connected in parallel with the capacitor in the time delay element, allows the capacitor to discharge completely after such a disturbance event. In order to provide overvoltage protection for the components, on the one hand, while on the other hand providing as great a resistance to surge currents as possible, each detection system also has an overvoltage protective element, preferably a suppressor diode, connected in parallel with each secondary winding.

BRIEF DESCRIPTION OF THE DRAWINGS

An exemplary embodiment of the invention will be explained in more detail in the following text with reference to drawings, in which:

FIG. 5 shows, in an illustration corresponding to that in FIG. 4, the tripping current profile of a protective device which is sensitive to pulsed currents.

Parts which correspond to one another are provided with the same reference symbols in all the figures.

DETAILED DESCRIPTION OF THE PREFERRED EMBODIMENTS

Figure 1:
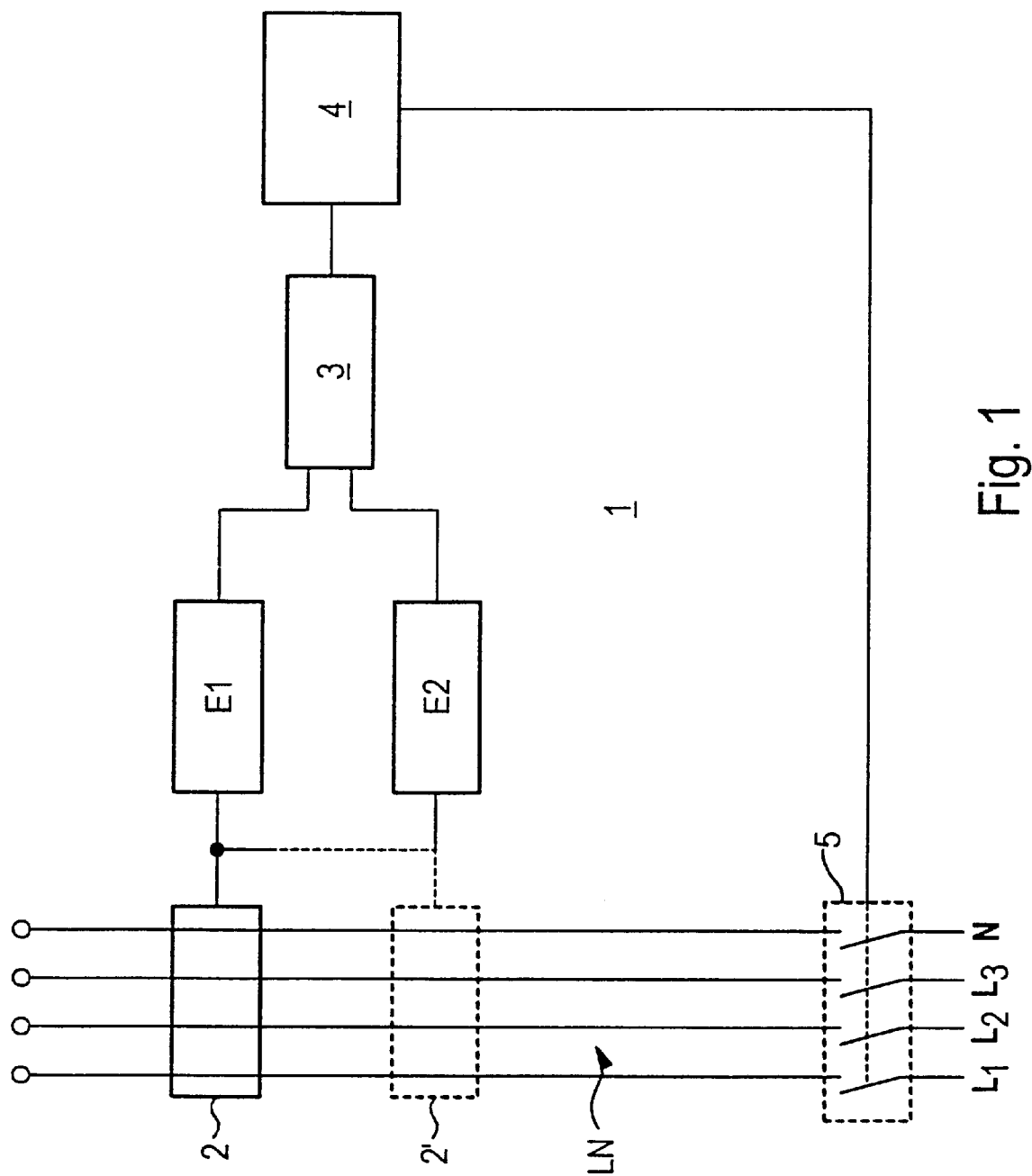
FIG. 1 shows, schematically, an outline circuit diagram of a fault current protective device with two detection systems.

The fault current protective device 1 which is illustrated in outline form in FIG. 1 has two detection systems E1 and E2 with a core balance transformer 2 which is shared by them, or each with their own core balance transformer, 2 and 2', respectively. The two detection systems E1 and E2 feed a tripping relay 3, which is shared by them and is mechanically coupled to a switching mechanism 4. The switching mechanism 4, which is designed in a manner that is not illustrated in any more detail as an unlatching system, is coupled to a contact system 5. Three phase conductors $L_i$, where i=1,2,3, as well as a neutral conductor N of a 4-conductor main system LN are passed through the or each core balance transformer 2,2'. The FI protective device 1 is in this case followed by an electrical load (not illustrated) which is supplied with power from the conductor main system LN.

Figure 2:
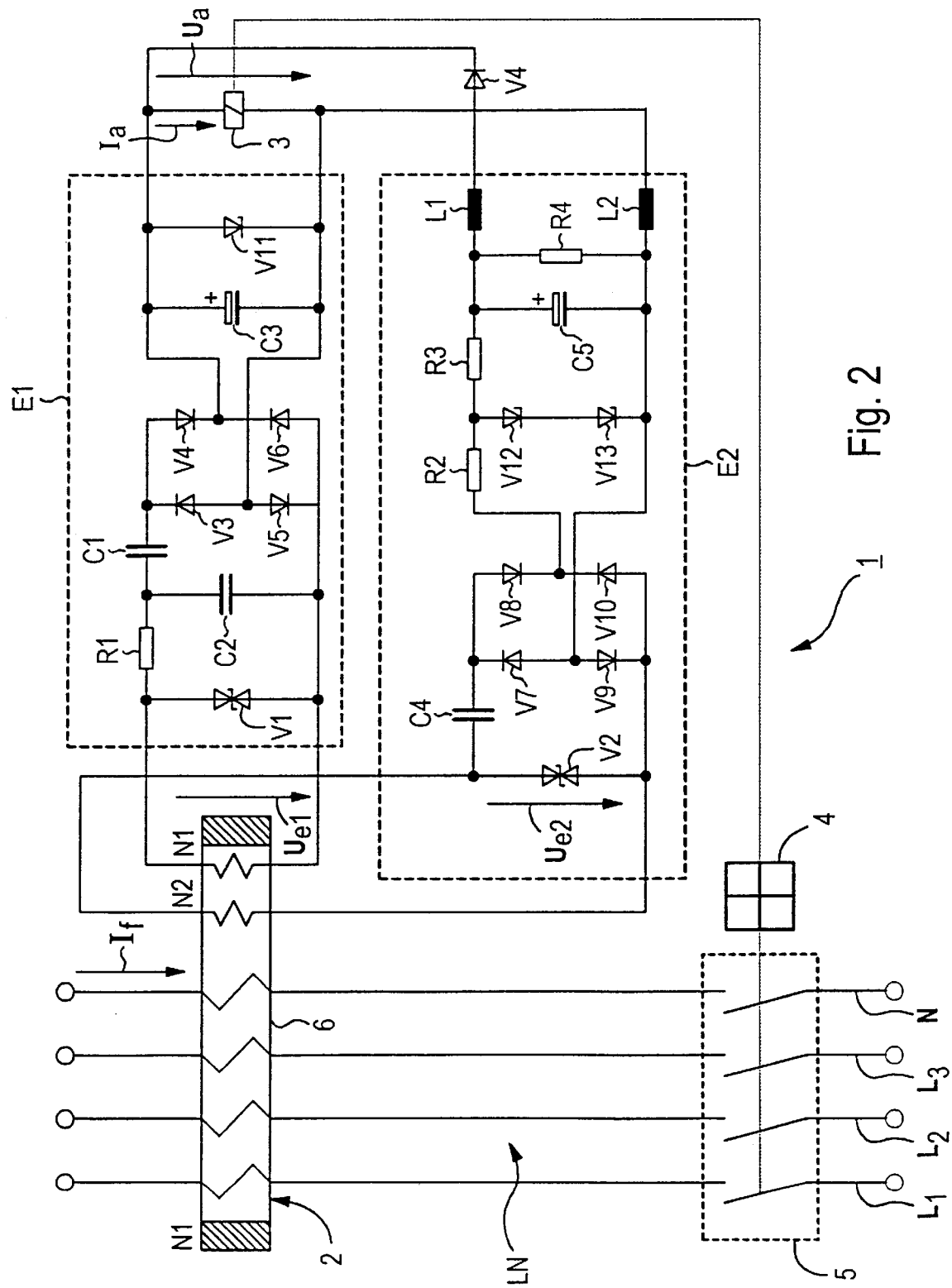
FIG. 2 shows the detection systems of the protective device as shown in FIG. 1, in the form of a block diagram.

FIG. 2 shows one preferred circuit embodiment for the two detection systems E1 and E2, which are connected to respective secondary windings N1 and N2 of the core balance transformer 2 which is shared by them. The core balance transformer 2 has a transformer core 6 which is composed of nanocrystalline or amorphous material and is suitable for detecting both low-frequency and high-frequency fault currents $I_f$. The core balance transformer 2 is designed to be a particularly low-loss device, and is thus suitable for detecting and transmitting even high-frequency fault currents $I_f$, up to a fault current frequency f of about 20 kHz.

During normal operation of the conductor main system LN and of the load, the vectorial sum of the currents flowing through the transformer core 6 is always zero. A disturbance occurs when, for example, an insulation fault results in some of the current that is supplied being carried away via ground as a fault current or differential current $I_f$ on the load side. In this case, the vectorial sum of the currents flowing through the transformer core 6 assumes a value other than zero. This differential or fault current $I_f$ induces an input or voltage signal $U_{e1}$, $U_{e2}$, in the secondary windings N1, N2, and this is used as a measure of the fault current $I_f$ and is supplied to the respective detection system E1 or E2.

The respective detection system E1, E2 which is operating with a tripping function converts the input voltage E in the form of $U_{e1}$ or $U_{e2}$, respectively, to an output voltage $U_a$ and to a corresponding current $I_a$ which is passed through the tripping relay 3. If the fault current $I_f$ exceeds a nominal or tripping value which is set in the first detection system E1 or in the second detection system E2, and/or in the tripping relay 3, the tripping relay 3 (which is connected on the output side to the two detection systems E1, E2 and is preferably in the form of a holding magnet) is tripped. In consequence, the switching mechanism 4 (which is coupled to the tripping relay 3) opens the switching contacts of the contact system 5, which acts on all the conductors $L_i$ in the conductor main system LN.

The first detection system E1 is in this case preferably matched to fault currents $I_f$ of 50 Hz, so that, for this fault current frequency f, the tripping conditions are satisfied for sinusoidal alternating fault currents corresponding to Type AC in EN Standard 61008 or, at the same time, pulsating direct fault currents are satisfied in accordance with Type A of EN Standard 61008. As the fault current frequency f increases, the profile of the tripping fault current $I_A$ rises steeply with the fault current frequency f in such a way that it still maintains a sufficient safety margin below the limit curve G1, which is illustrated in FIG. 3, for ventricular fibrillation in accordance with IEC Standard 60479.

Figure 3:
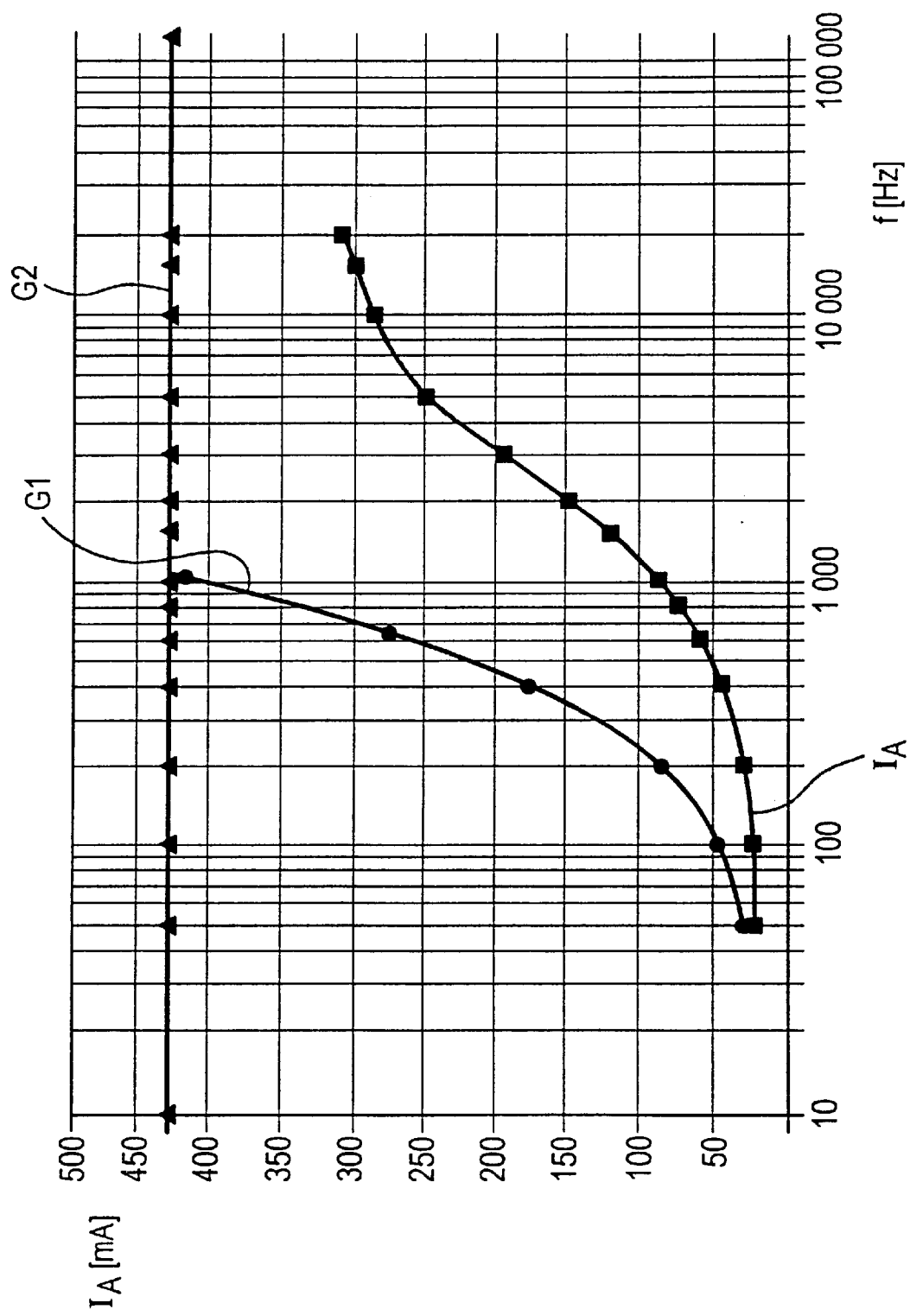
FIG. 3 shows, in the form of a logerithmically plotted frequency/tripping fault current graph, a limit curve for ventricular fibrillation in accordance with IEC 60479, and a limit curve for fire prevention, as well as the tripping fault current curve of the protective device.

The profile of the tripping fault current $I_A$, which is illustrated in the form of a frequency/tripping fault current graph in FIG. 3 with the fault current frequency f plotted in logarithmic form on the abscissa and the tripping fault current $I_A$ plotted on the ordinate, advantageously rises steeply as the fault current frequency f increases, such that the FI protective device 1 is insensitive to fault currents $I_f$ in the higher frequency band, in particular transient fault currents $I_f$. Transients such as these, that is to say electrical disturbance voltages or disturbance pulses which occur once and are not cyclic, may also occur frequently in certain equipment in the conductor main system LN.

In the exemplary embodiment, the first detection system "E1 operates without any delay with, for example, tripping times of $\tau \leq 40$ ms being achieved for a fault current frequency f of, for example, 1 kHz and a fault current $I_f$ of 420 mA, which represents the upper limit for ventricular fibrillation. The first detection system E1 may, however, also be designed to have a short time delay. Before the tripping fault current $I_A$ of the first detection system E1 reaches the maximum acceptable value of 430 mA for fire protection as the fault current frequency f increases, the second detection system E2 takes over the tripping function. This takes place above the changeover frequency $f_{ü}$, which is not less than 1 kHz. This is illustrated in the respective frequency/tripping fault current graphs in FIGS. 4 and 5 for an FI protective device 1 which is sensitive to pulsed currents, and such a device which is sensitive to all currents.

Figure 4:
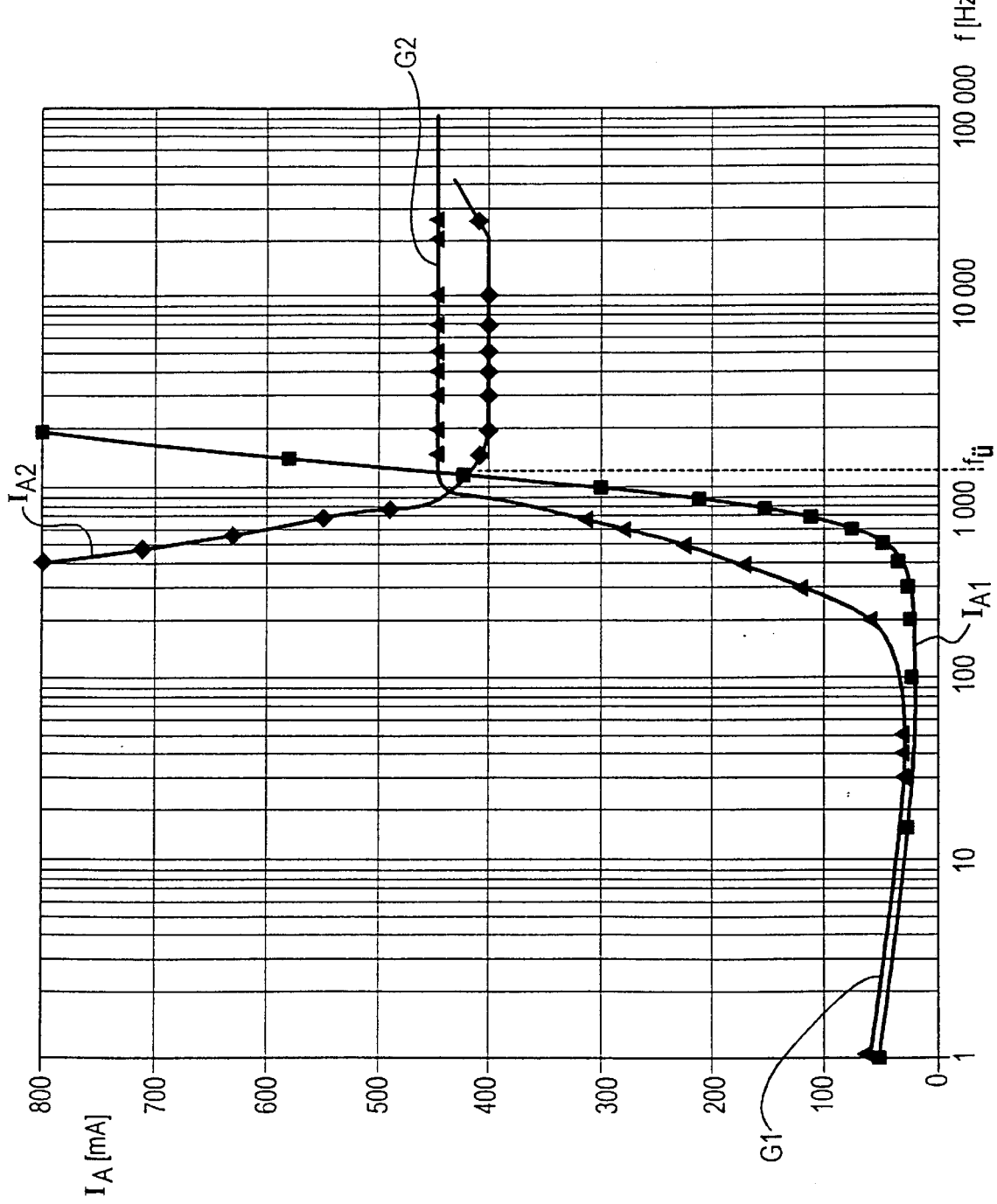
FIG. 4 shows, in the form of a graph corresponding to that in FIG. 3, the tripping current curves, which intersect at a changeover frequency, of the two detection systems for a protective device which is sensitive to all currents.

The graphs shown in FIGS. 4 and 5 illustrate the profile of the respective tripping fault currents $I_{A1}$, and $I_{A2}$ for the first detection system E1 and the second detection system E2, respectively. It can be seen from this that the two tripping fault current curves $I_{A1}$, and $I_{A2}$ intersect both below the limit curve G1 for ventricular fibrillation and below the limit curve G2 for fire protection, at the changeover frequency $f_{ü}$.

The second detection system E2 is designed such that the tripping fault current $I_A$ has a sufficient safety margin below the value of 430 mA, which is the governing factor for fire protection, from the changeover frequency $f_{ü}$ up to a fault current frequency f of at least 20 kHz. At the same time, the tripping fault current $I_a$ in this frequency band should be greater than 200 mA, to ensure that the FI protective device 1 is not sensitive to transient fault currents $I_f$ in the higher frequency band, such as those which occur, for example, during switching operations in the conductor main system LN.

Furthermore, the FI protective device 1 is designed so as to ensure resistance to surge currents of more than 1000 A with an 8/20 μs wave in accordance with VDE Standard 0432, Part 2. Surge currents such as those which can occur as a result of lightning strikes are simulated in a surge current test such as this. In this case, the requirement is that tripping shall not occur in response to fault currents $I_f$ of, for example, 250 A which last for a very short time (for example rise time 8 μs and full time, to half value, 20 μs) but whose amplitude is very high.

When a fault current $I_f$ occurs, an input voltage $U_{e1}$ is induced in the secondary winding N1 of the first detection system E1, is rectified via a bridge rectifier formed by four diodes V3 to V6, and is smoothed by a smoothing capacitor C3, which is connected in parallel on the direct current side. The rectified output voltage $U_a$ produces an output current $I_a$ through the tripping relay 3. As soon as the fault current $I_f$ reaches the tripping value, the tripping relay 3 trips and, via the switching mechanism 4, opens the switch in the contact system 5 of the FI protective device 1.

A suppressor diode V1, which is connected in parallel with the secondary winding N1 in the first detection system E1, limits the voltage induced in the secondary winding N1 to a specific value. This is done in order firstly to protect the components of the detection system A1 against overvoltages and in order, and secondly, to provide a high level of resistance to spurious tripping of the FI protective device 1 in the event of surge currents, for example as a result of lighting strikes, flowing via the primary winding (which is formed by the conductors $L_i$,N) of the core balance transformer 2.

A series capacitor C1, which is connected on the alternating current side upstream of the bridge rectifier V3 to V6 in the detection system E1, forms, together with the inductance of the secondary winding N1, a resonant circuit, which is tuned to approximately 50 Hz, thus providing the tripping relay 3 with the maximum tripping volt amperes, and hence with the maximum possible tripping energy. A capacitor C2, which is connected in parallel with the secondary winding N1 in the first detection system E1, forms a low-pass filter and has a capacitance such that the tripping fault current $I_A$ rises as the fault current frequency f increases, but remain below the limit curve G1 for ventricular fibrillation. A series resistor R1 on the alternating current side prevents the secondary winding N1 of the first detection system E1 from being short-circuited directly via the capacitor C2 for high fault current frequencies f. Thus, for high fault current frequencies f, the resistor R1 acts as a burden for the core balance transformer 2 and is, to a major extent, an additional governing factor for the tripping fault current $I_A$ of the second detection system E2.

A zener diode V11, which is connected in parallel with the smoothing capacitor C3, limits the output voltage $U_a$ across the tripping relay 3, which is preferably in the form of a holding magnet, and prevents it from being remagnetized by high fault currents $I_f$, which would otherwise lead to a failure to trip. In addition, the zener diode V11 improves the resistance of the protective device 1 to surge currents. The zener diode V11 used here has a zener voltage of 1 V and therefore, by virtue of the technology, is operated in the forward direction.

Above the changeover frequency $f_{ü}$ which is, for example, between 1 kHz and 4 kHz, the output voltage $Ua$ and the output current $I_a$ (output signal $U_a$,$I_a$) of the first detection system I1 are less than the respective output voltage $Ua$ and the output current $I_a$ (output signal $U_a$,$I_a$) of the second detection system E1. The second detection system E2 thus takes over the tripping function above this changeover frequency $f_{\ddot{u}}$.

The second detection system E2 likewise has a bridge rectifier with four diodes V7 to V10. The secondary winding N2 of the second detection system E2 is likewise followed, on the alternating current side, by a series capacitor C4, whose capacitance is, however, considerably less than the capacitance of the series capacitor C1 in the first detection system E1. This is because the detection system E2 is tuned to a higher resonant frequency than the detection system E1. This means that, in the lower frequency band, that is to say below the changeover frequency $f_{\ddot{u}}$ the second detection system E2 does not supply any output signal $U_a, I_a$ which can be evaluated, thus preventing the output signals $Ua, Ia$ from the two detection systems E1 and E2 from intersecting. The input voltage $U_{e2}$, which is induced by a high-frequency fault current $I_f$ in the secondary winding N2 of the second detection system E2, is rectified in an analogous manner by the bridge rectifier V7 to V1, and its voltage is likewise limited by means of a suppressor diode V2, connected in parallel with the secondary winding Nz.

In order that short-term, high-frequency disturbance fault currents $I_f$ with a time duration of a few milliseconds, such as those which occur when switching inductive loads on long cables, do not lead to spurious tripping, the second detection system E2 has a short time delay. In this case, the tripping time for a fault current frequency $I_f$ of at least 3 kHz and for a fault current $I_f$ of 430 mA is expediently about 300 ms. This tripping time is thus considerably shorter than the required disconnection time in the TN main system, thus providing optimum fire protection.

Disturbance voltages induced in the secondary winding N2 of the second detection system E2 are initially limited via two series-connected zener diodes V12 and V13, with this series circuit formed by the two zener diodes V12 and V13 being connected in parallel, on the direct current side, with the bridge rectifier V7 to V10. The zener diodes V12 and V13 likewise have a zener voltage of 1V and are thus likewise, by virtue of the technology, operated in the forward direction. When the zener diodes V12 and V13 respond, a resistor R2 limits the current spikes that occur in this case to a value which is compatible with the diodes V12 and V13.

The short time delay is produced via a time delay element (delay circuit) in the second detection system E2, comprising a parallel capacitor C5 on the alternating current side, and a series resistor R3 connected upstream of it. After a disturbance event, a parallel resistor R4 ensures that the capacitor C5 is discharged completely.

The capacitive coupling of the two secondary windings Ni and N2 of the core balance transformer 2 which is shared by the two detection systems E1 and E2 additionally allows circulating currents, which are caused by high-frequency disturbance fault currents $I_f$ to flow via the two detection systems E1 and E2 and via the tripping relay 3. The short time delay via the delay element R3, C5 may thus, possibly, not be a sufficient measure on its own. Two inductors L1 and L2 are thus inserted into the secondary detection system E2, so that these circulating currents are reliably damped to such an extent that short-term, high-frequency disturbance fault currents $I_f$ resulting from switching operations in the main system do not lead to spurious tripping.

In order to prevent the detection systems E1 and E2, which act on the tripping relay 3 that is shared by them, from influencing one another, a decoupling diode V14 is connected upstream of the tripping relay 3. The DC output voltages $U_a$ which are produced by rectification of the input voltages $U_{e1}$ and $U_{e2}$ via the two detection systems E1 and E2, are thus decoupled via the diode V14. This in each case means that that detection system E1, E2 which is supplying the respectively higher output voltage $U_a$ at a specific fault current frequency f takes over the tripping function, and trips the tripping relay 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A protective device comprising:
   at least two detection systems with a core balance transformer whose secondary winding is followed by a tripping relay for operating a switching mechanism which switches a conductor network, wherein a first detection system carries out a tripping function for a fault current at a fault current frequency below a changeover frequency, and wherein a second detection system carries out the tripping function for fault currents above the changeover frequency.

2. The protective device as claimed in claim 1, wherein the changeover frequency is not less than 1 kHz.

3. The protective device as claimed in claim 1, wherein the first detection system is matched to a first fault current frequency, which is below the changeover frequency, with the tripping fault current being below a first limit curve for ventricular fibrillation at least up to the changeover frequency, and wherein the second detection system is tuned such that the tripping fault current above the changeover frequency is below a second limit curve which ensures fire protection.

4. The protective device as claimed in claim 3, wherein a transformer core of the core balance transformer is formed from at least one of nanocrystalline and amorphous material.

5. The protective device as claimed in claim 1, wherein the first detection system is matched to a fault current frequency of a frequency band from 50to about 400 Hz, such that, at this fault current frequency band, the tripping conditions are satisfied for at least one of sinusoidal alternating fault currents of Type AC according to EN Standard 61008 (=VDE 0664 Part 10), and sinusoidal alternating fault currents and pulsating direct fault currents of Type A according to EN Standard 61008.

6. The protective device as claimed in claim 1, wherein the core balance transformer includes a first secondary winding, associated with the first detection system, and a second secondary winding, associated with the second detection system.

7. The protective device as claimed in claim 6, wherein both the first detection system and the second detection system include a rectifier, each of which is connected on an alternating current side to a respective secondary winding of the core balance transformer, and is connected on a direct current side to the tripping relay, common to both detection systems and including a decoupling diode upstream of it on the direct current side.

8. The protective device as claimed in claim 6, wherein the second detection system includes at least one inductor for circulating current damping.

9. The protective device as claimed in claim 1, wherein the first detection system includes a low-pass filter, which is designed such that the tripping fault current rises with increasing fault current frequency up to the changeover frequency and is below the limit curve for ventricular fibrillation.

10. The protective device as claimed in claim 6, wherein the first detection system includes a series resistor on the alternating current side.

11. The protective device as claimed in claim 6, wherein the first detection system includes a first series capacitor, and the second detection system includes a second series capacitor, whose capacitance is less than that of the first series capacitor.

12. The protective device as claimed in claim 6, wherein the rectifier in the first detection system is followed, on the direct current side, by a smoothing capacitor.

13. The protective device as claimed in claim 1, wherein the second detection system includes a time delay element, which is formed by a parallel capacitor and a series resistor.

14. The protective device as claimed in claim 1, wherein the tripping relay includes a first zener diode connected in parallel with it in the first detection system, and includes at least one second zener diode connected in parallel with it in the second detection system.

15. The protective device as claimed in claim 1, wherein each detection system includes overvoltage protection.

16. The protective device of claim 1, wherein the protective device is a fault current protective device.

17. The protective device as claimed in claim 2, wherein the first detection system is matched to a first fault current frequency, which is below the changeover frequency, with the tripping fault current being below a first limit curve for ventricular fibrillation at least up to the changeover frequency, and wherein the second detection system is tuned such that the tripping fault current above the changeover frequency is below a second limit curve which ensures fire protection.

18. The protective device as claimed in claim 17, wherein a transformer core of the core balance transformer is formed from at least one of nanocrystalline and amorphous material.

19. The protective device of claim 5, wherein the fault current frequency band is a fault current frequency of 50 Hz.

20. The protective device as claimed in claim 1, wherein both the first detection system and the second detection system include a rectifier, each of which is connected on an alternating current side to a respective secondary winding of the core balance transformer, and is connected on a direct current side to the tripping relay, common to both detection systems and including a decoupling diode upstream of it on the direct current side.

21. The protective device as claimed in claim 7, wherein the second detection system includes at least one inductor for circulating current damping.

* * * * *